United States Patent Office 3,121,680
Patented Feb. 18, 1964

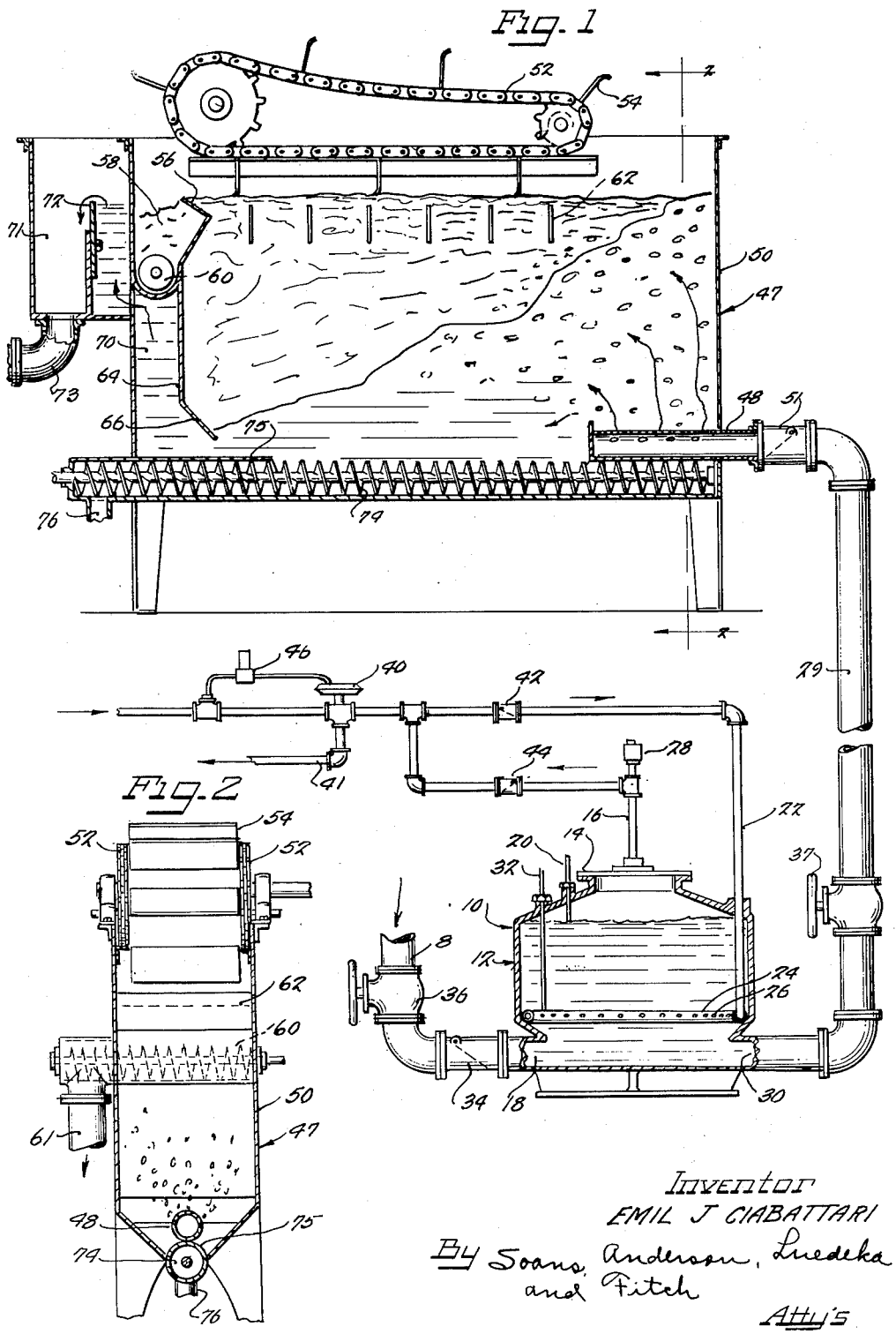

3,121,680
METHOD AND APPARATUS FOR TREATING FLUID MATERIAL WITH SUSPENDED SOLIDS
Emil J. Ciabattari, Chicago, Ill., assignor to Yoemans Brothers Company, Melrose Park, Ill., a corporation of Delaware
Filed Oct. 27, 1958, Ser. No. 769,653
3 Claims. (Cl. 210—44)

The present invention relates generally to fluid material having solids suspended therein, such as sewage and industrial waste, and more particularly, it relates to a method and apparatus for providing an effluent from waste material from which has been removed solid material in the form of a concentrated sludge.

In the treatment of fluid waste material, such as sewage and industrial waste, which contain suspended solids including organic matter, inorganic matter and trash or the like, the trash is normally first removed by the utilization of grit chambers, racks, and screens, after which the settleable solids are removed by the utilization of a settling basin or primary settling tank. After this separation, the remaining fluid material may be subjected to various secondary treatments, for example, it can be treated by an activated sludge process or a filtering process, etc. In normal course, the effluent from the secondary treatment process is introduced into a clarifying or settling tank, wherein a sludge is permitted to settle from the fluid waste material.

The presently available equipment for clarifying or settling fluid waste material, whether treated or untreated, is relatively inefficient and requires large sized apparatus. This apparatus is usually in the form of relatively long rectangular settling tanks, in which waste slowly flows through permitting the sludge to settle. The solid matter in the settled sludge, which is withdrawn from the settling tank, is ordinarily subjected to further treatment, such as incineration or digestion. The solids in the sludge are not substantially concentrated. Vacuum or pressure filters, or centrifuges, are often required to concentrate the resulting sludge, i.e., reduce its moisture content and to make it handleable in subsequent operations. However, these filters have a high initial cost and require frequent cleaning and repair.

In a recent development in the treatment of sewage, the sludge is concentrated, heated under pressure, and oxidized. However, in order to provide satisfactory operation of such a process, it is necessary to provide a sludge which has between about 5 percent and about 12 percent of solids so that combustion is sustained in the process. Certain high cost units have been developed for concentrating the sludge in this process and, in this connection, centrifugal separators can be employed.

Though the centrifugal separators can provide a sludge having a fairly high solid content, yet under high rate of flows, the clarification of the effluent is, at times, impaired because the finer and lighter volatile solids and other materials escape with the effluent. Thus, a centrifuged sludge, unless constantly controlled, has a lower volatile solid content and it becomes more difficult, if not impossible, to burn the centrifuged sludge without additional fuel. In addition, the centrifugal separators, having definite mechanical and physical limitations, are limited in capacity, whereas with the improved process and apparatus of this invention, I can obtain sludge having a high solid content, which includes the lighter and finer particles, thereby having a clear effluent, even under conditions of high through-put, and with resulting economies in fuel consumption and greater efficiency.

Accordingly, it is an object of this invention to provide improved means for concentrating solids which are suspended in fluid waste material. It is a further object of this invention to provide an improved method for concentrating solids in fluid waste material to provide a sludge having a higher solid content. It is still a further object of this invention to provide a highly efficient method and apparatus for clarifying fluid waste material and concentrating the resulting sludge. In this connection, it is an object to provide compact and economical equipment for substitution for presently used concentrating and clarifying equipment. It is still a further object of this invention to provide equipment which can make presently operating sewage plants more efficient in their operation.

These and other objects of the invention will become apparent by reference to the accompanying drawing and following description:

In the drawing:

FIGURE 1 is a side elevational view, partly in section, illustrating a concentrating and clarifying apparatus constructed in accordance with the present invention; and FIGURE 2 is an end view taken along line 2—2 of FIGURE 1.

This invention is described in connection with sewage to facilitate its disclosure, but it will be understood that it has application to other fluid waste material containing suspended solids in concentrations below about 10 percent. In accordance with this invention, sewage, which as herein used refers to sewage from which trash has been removed, or sewage which has been treated by an activated sludge process, a filter process, etc., is diffused with sufficient air so that air is present in excess of its solubility in the sewage. The highly aerated sewage is then periodically dispersed in the lower portion of a tank. In the tank, the excess air escapes and the sludge particles are carried toward the surface and, because of the periodic dispersion of the aerated sewage in the tank, the sludge particles are concentrated in the upper portion of the fluid within the tank. The concentrated sludge is skimmed from the surface, by suitable means, and is collected. This concentrated sludge can be disposed of by burning in presently available equipment, or by digestion in a conventional manner. Any sand, grit, or relatively dense material in the sewage settles to the bottom of the tank and is removed. Effluent is removed from the bottom of the tank and may be discharged into a stream or, under some conditions, may be subjected to further treatment.

Now referring to the drawing, the sewage, whether treated or untreated, is delivered through inlet piping 8 to an aerating means, such as the one designated in FIGURE 1 by the reference numeral 10, which is a combination pneumatic ejector and aerator, and which is fully described in a co-pending application, Serial No. 460,854, filed October 7, 1954, now Patent No. 3,049,489. The pneumatic ejector and aerator 10 comprises a receiver 12 which is generally cylindrical and includes a dome-shaped top portion which has a removable central cover plate 14 through which extends an air exhaust pipe 16.

The sewage, which is delivered from the inlet, pipe 8 to the receiver 12 through a fluid inlet passageway 18 disposed near the lower end thereof, is collected in the receiver 12 until the sewage level makes contact with a control device, which may be an electrode 20 extending vertically through the dome of the receiver 12. When the sewage level reaches the electrode 20, an electrical circuit (not shown) causes compressed air to be delivered through an air inlet pipe 22 which extends through the dome of the receiver 12, the lower end of which terminates in an annular conduit portion 24 that is provided with small openings 26 and that is located in the lower portion of the receiver 12. Thus, air is diffused at the lower portion of the sewage within the receiver 12, bubbles upwardly through the sewage, and is collected within the dome of the receiver.

A portion of the air, which is collected in the dome of the receiver 12, is permitted to escape to the atmosphere through a relief valve 28 connected to the air exhaust pipe 16. By this arrangement, the sewage in the receiver 12 is subjected to agitation which throughly mixes and aerates it. As the pressure of the air in the receiver 12 increases, it forces the highly aerated sewage within the receiver out through outlet piping 29 connected to a fluid outlet passageway 30, disposed in the lower portion of the receiver. The sewage is discharged until the sewage level is lowered to a position where a second control device, which in the illustrated embodiment is an elongated electrode 32 extending through the dome of the receiver, causes the compressed air to be cut off. The electrode 32 also is connected to an electrical circuit (not shown) which effects cutting off of the compressed air.

A check valve 34 is disposed in the inlet piping 8 to prevent a back flow of the sewage during the ejecting cycle.

A pair of manually controlled valves 36 and 37 are located in the inlet and outlet piping 8 and 29, respectively, of the receiver 12 for maintenance and other purposes. As previously indicated, an air compressor (not shown) and a piping arrangement are provided to supply compressed air to eject the sewage from the receiver 12 and to permit air remaining in the receiver after the ejection of the sewage to escape to the atmosphere as the sewage is collected in the receiver. The piping arrangement illustrated comprises a three-way diaphragm valve 40 which, when actuated by the control circuit associated with the electrode 20, causes compressed air to be fed from the compressor through the air inlet pipe 22 into the receiver 12. Alternately, the valve 40 permits the receiver 12 to bleed air to the atmosphere through pipe 41 during the filling. The diaphragm valve 40 may be actuated by compressed air supplied through a solenoid 46 controlled by the electrodes 20 and 32. A check valve 42 is disposed downstream of the diaphragm valve 40 to prevent a back flow of sewage.

During filling of the receiver 12, air escapes from the receiver 12 through the air exhaust pipe 16 and thence through the diaphragm valve 40 and pipe 41 to the atmosphere. A check valve 44 is disposed between the diaphragm valve 40 and the vent 28 to prevent compressed air from being introduced into the receiver above the sewage.

The aerated sewage, which is discharged from the ejector 10 is delivered to a sludge concentrating unit 47 through a disperser 48, which is located near the bottom at one end of a tank 50. A weighted check valve 51 is utilized ahead of the disperser 48 to prevent back flow from the tank 50 into the ejector 10.

The disperser 48 extends a short distance into the tank 50, and the portion within the tank is perforated and closed at its inner end so that the sewage is directed in an upwardly direction into the tank 50. While the tank 50 can be of various sizes and configurations, it is preferably elongated and rectangular such as that illustrated in the drawing, and is made of a suitable material, such as steel or concrete.

Because of the aeration of the sewage, the solid particles, which would normally settle, go to the surface. The periodic discharge of the aerated sewage from the ejector 10 causes the sludge to concentrate at the upper surface, thereby permitting removal of a sludge having a relatively high solid content.

To remove the concentrated sludge from the upper surface, a skimming means is provided which may be in the form of a driven continuous conveyor 52 that has a plurality of outwardly extending spaced-apart flights 54 disposed thereon, as illustrated in FIGURE 1. The conveyor 52 is mounted on the tank in such a relation to the surface that the outer ends of the flights 54 skim the surface without breaking through the blanket of sludge which is building up on the surface of the liquid. The sludge, which is skimmed off, is pushed over a baffle 56 and is collected in a sludge trough 58, which is disposed at the end of the tank 50 opposite from the disperser 48. The collected sludge is removed by conveying means, such as the screw conveyor 60 extending transversely across the tank 50, and is delivered to an outlet conduit 61 for transfer to other facilities in the sewage treatment plant, such as an incinerator or digester, for further treatment.

A plurality of vertical, spaced-apart, transversely extending plates or baffles 62 are disposed in the upper portion of the tank 50, just below the surface to limit disturbance of the sludge blanket during the skimming of the sludge and to assure proper concentration of the sludge.

Effluent is removed from the lower portion of the tank 50 below a vertically extending partition 64 located adjacent the end of the tank 50 opposite from the disperser 48. To reduce the possibility of the sludge particles which are concentrated in the upper portion of the tank from being withdrawn with the effluent, a baffle 66 is provided which depends at an angle from the partition 64, as shown in FIGURE 1. The effluent passes below the baffle 66 and upwardly through a passageway 70 defined between the end wall of the tank 50 and the partition 64. The effluent leaves the passageway 70 and enters a box 71 mounted on the end of the tank 50. An adjustable weir 72 is located in the box 71 and the effluent flows over the weir. Adjustment of the weir 72 adjusts the level of material in the tank 50. The effluent discharges out through an effluent outlet pipe 73 to further treatment or final disposal.

Any sand, grit or other high density material which may be contained in the aerated sewage entering the tank 50 settles to the bottom of the tank 50, and is removed by conveying means such as screw conveyor 74 disposed longitudinally along the bottom of the tank 50 as shown in the drawing. In order to limit disturbance of the sludge blanket during the operation of the screw conveyor 74, the conveyor is enclosed in a pipe 75 which extends within the tank 50 a distance somewhat greater than the distance from the end wall of the tank 50 of the innermost tip of the baffle 66. The conveyor 74 discharges the collected material out through a pipe 76.

In one particular operation of the apparatus, the sewage containing 0.385 percent solids was discharged from the ejector 10 in ½ minute cycles (i.e. ½ minute to fill and ½ minute to discharge), utilizing compressed air at a pressure of 60 lbs. per square inch. The pressure was reduced to 40 lbs. per square inch by the weighted check valve 51 before being discharged into the elongated rectangular tank 50 through the disperser 48. The conveyor 52 was operated at a speed of approximately 0.8 foot per minute and the conveyor was adjusted so that the flights 54 would remove about 0.25 inch of sludge. The resulting sludge had a solid content of approximately 8.2 percent, and a high B.t.u. value.

It will be apparent to one skilled in the art that various adjustments may be made in the apparatus of the invention to provide a desired concentration of solid material in the sludge and to provide more effective operation of the process of the invention. In this connection, the amount of solid material in the waste material may vary from time to time thereby necessitating the use of different degrees of aeration. This, of course, can be accomplished by the use of higher air pressures and longer holding periods. Likewise, adjustments can be made in the disperser 48 so as to assure fine dispersion of the air into the tank 50. Control of the size of these openings will depend, in part, upon the material being treated and, more particularly, will depend upon the size of solid material in the waste material. In the illustrated embodiment, the holes in the disperser 48 are about 0.25 inch in diameter.

Another controlling factor in the operation of the apparatus of the invention is the throughput rate. It will be obvious that if the throughput is at too rapid a rate, the unit will not operate effectively and there will be excessive amounts of solid material in the effluent.

As before indicated, effective concentration of the solids in the sewage requires a pulsating dispersion of the sewage into the tank 50. However, the dispersion should be effected on at not more than about a five minute cycle, but not less than about a 15 second cycle. It will be understood, of course, that longer cycles will give some concentration of the solid material, but will not give a high degree of concentration. Shorter cycles are not generally feasible at this time.

In order to obtain the best results, the flights 54 on the conveyor 52 should not break the sludge blanket, as before indicated. However, the flights can be adjusted to skim off varying amounts of sludge and it will be apparent that the depth of skimming will control, in part, the amount of solids concentration. Likewise, the speed of the conveyor will be related to the degree of concentration, in inverse relation.

Adjustment of the level of the weir 72 will, of course, affect the throughput rate, the degree of skimming, and the overall operation of the device. Suitable adjustment can be made.

The location of the lower end of the partition 64, of course, is related to the clarity of the effluent recovered. It is desired that this be close to the top of the screw conveyor 74 used for the discharge of sand, grit and other high density materials.

The foregoing method and apparatus permits sludge to be separated and concentrated in an effective and in an economical manner. The sludge resulting from the foregoing method and apparatus is reduced in moisture to an extent that it can be effectively treated in existing equipment.

Various of the novel features of the invention are set forth in the appended claims.

I claim:

1. An apparatus for clarifying sewage and concentrating the sludge particles therein comprising an elongated rectangular tank at generally atmospheric pressure, dispersing means disposed in said tank near the lower portion of one end of said tank, conduit means connected by one end of said dispersing means, means connected to the other end of said conduit means for aerating and periodically discharging the sewage under pressure through said dispersing means into said tank, whereby the air in excess of saturation is released from the sewage and the sludge particles are carried upwardly and are concentrated in the upper portion of said tank, said tank having an opening adjacent the end of said tank opposite the dispersing means for removing fluid from the lower portion of said tank, baffle means disposed over said opening to reduce the possibility of sludge particles being withdrawn with the fluid, a trough disposed at the end of said tank opposite the dispersing means, means disposed in said tank for skimming sludge from the surface of the material in said tank into said trough, baffle means located in said tank below but adjacent the surface of the material therein for limiting the disturbance by said skimming means of the concentrated sludge in said tank, and means disposed in the lower portion of said tank for removing any high density solids from the lower portion of said tank.

2. A method for treating fluid material containing suspended particles, comprising the steps of accumulating a predetermined quantity of the material in a closed receiver having an outlet adjacent its lower level, aerating while discharging said predetermined quantity of fluid material by introducing pressure air into the receiver at a position below the level of fluid therein while continuously venting the receiver above the level of the fluid material, said continuous venting being at a rate substantially lower than the rate of flow of pressure air into the receiver so as to achieve sufficient pressure on the upper level of fluid material to discharge the material through the receiver outlet, delivering the aerated fluid material into the lower portion of a region of lower pressure, whereby the sludge particles are concentrated in the upper portion of the region and the air in excess of saturation is released from the fluid material, skimming the sludge particles from the surface of the region into a collecting trough, and baffling the region of lower pressure below but adjacent the surface of the material therein to limit disturbance of the concentrated sludge during said skimming step.

3. An apparatus for separating and concentrating sludge particles which are suspended in a fluid material, comprising a tank at generally atmospheric pressure, means for aerating and periodically discharging the fluid material under superatmospheric pressure into said tank comprising an air displacement type ejector including a receiver having an inlet and having an outlet adjacent its lower level, means for introducing compressed air into the receiver adjacent the lower portion thereof and operable to eject the fluid material after it has reached a predetermined upper level in said receiver, vent means disposed above said predetermined upper level to provide continuous venting of said receiver during ejection of the fluid material, and conduit means connected between said receiver outlet and said tank for conducting the aerated material from said aerating means into the lower portion of said tank, whereby the sludge particles in said fluid material are carried upwardly in said tank, means associated with said tank for removing the sludge particles from the surface of the material in said tank, baffle means located in said tank below but adjacent the surface of the material therein for limiting the disturbance by said sludge particle removing means of the concentrated sludge in said tank, and means associated with said tank for removing fluid from the lower portion of said tank.

References Cited in the file of this patent

UNITED STATES PATENTS

| 382,188 | Pitt | May 1, 1888 |
| 1,967,310 | Kent | July 24, 1934 |
| 2,334,703 | Henkel | Nov. 23, 1943 |
| 2,765,919 | Juell | Oct. 9, 1956 |
| 2,813,074 | Banks et al. | Nov. 12, 1957 |

FOREIGN PATENTS

| 491,623 | Great Britain | Sept. 6, 1938 |

UNITED STATES PATENT OFFICE
CERTIFICATE OF CORRECTION

Patent No. 3,121,680                          February 18, 1964

Emil J. Ciabattari

It is hereby certified that error appears in the above numbered patent requiring correction and that the said Letters Patent should read as corrected below.

In the grant, lines 2 and 12, and in the heading to the printed specification, lines 4 and 5, for "Yoemans Brothers Company", each occurrence, read -- Yeomans Brothers Company --; column 5, line 48, for "of" read -- to --.

Signed and sealed this 14th day of July 1964.

SEAL)

Attest:

ESTON G. JOHNSON
Attesting Officer

EDWARD J. BRENNER
Commissioner of Patents